Jan. 22, 1963 R R. WOOD 3,074,516
BRAKING MECHANISM FOR HAND TRUCK
Filed May 12, 1959 3 Sheets-Sheet 1
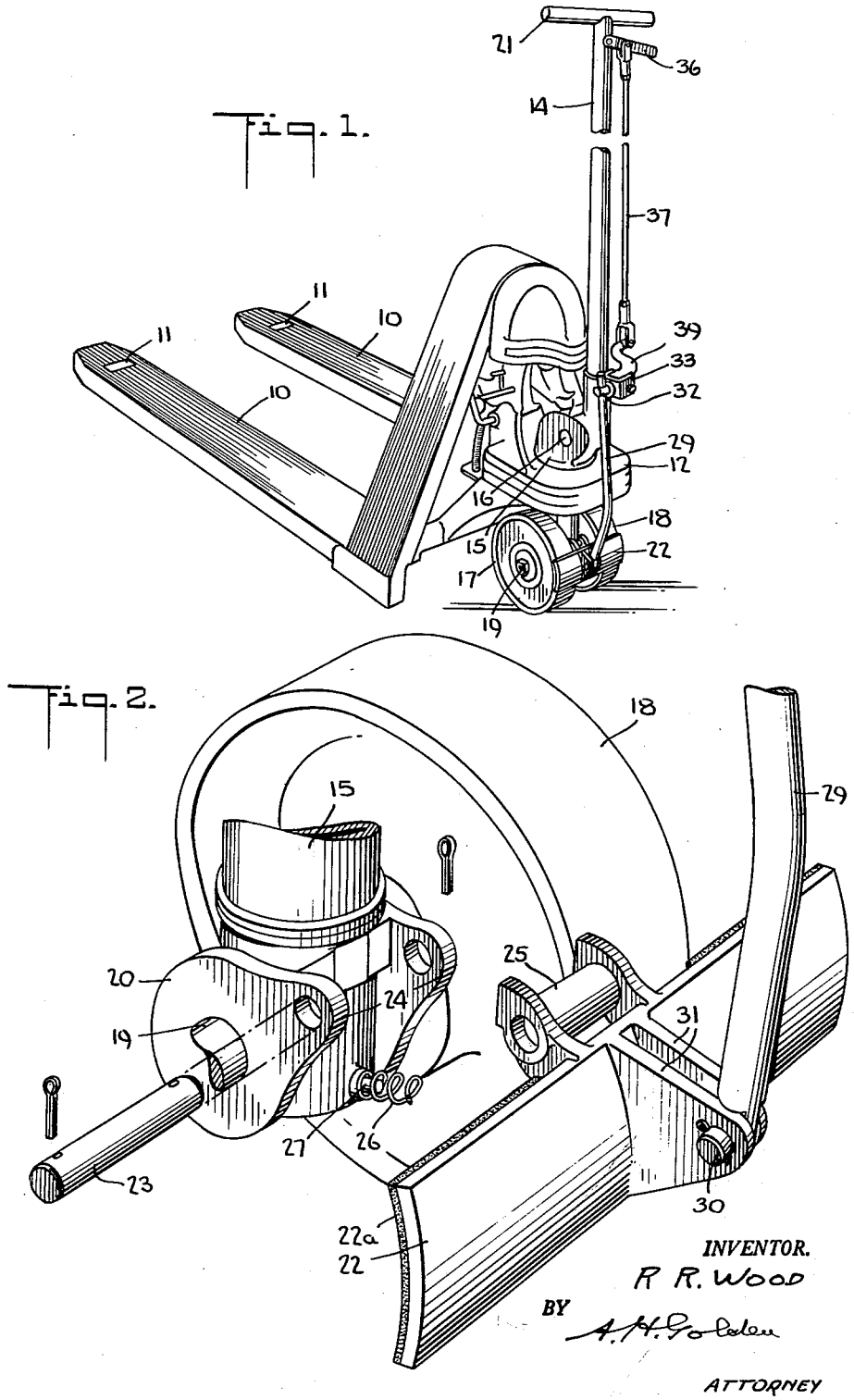
INVENTOR.
R. R. WOOD
BY
ATTORNEY Jan. 22, 1963 R. R. WOOD 3,074,516
BRAKING MECHANISM FOR HAND TRUCK
Filed May 12, 1959 3 Sheets-Sheet 2
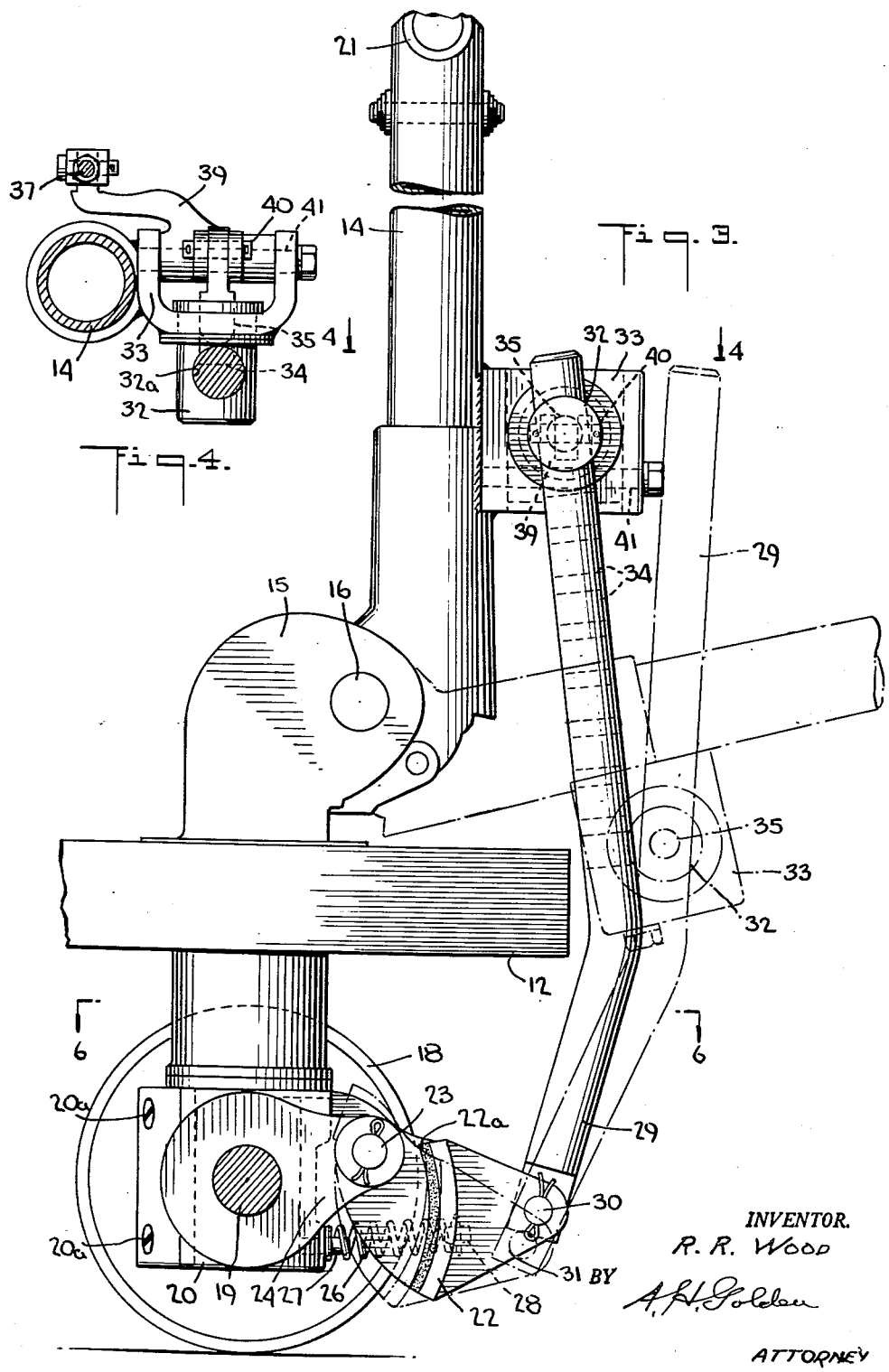
INVENTOR.
R. R. WOOD
BY A. H. Golden
ATTORNEY Jan. 22, 1963 R R. WOOD 3,074,516
BRAKING MECHANISM FOR HAND TRUCK
Filed May 12, 1959 3 Sheets-Sheet 3
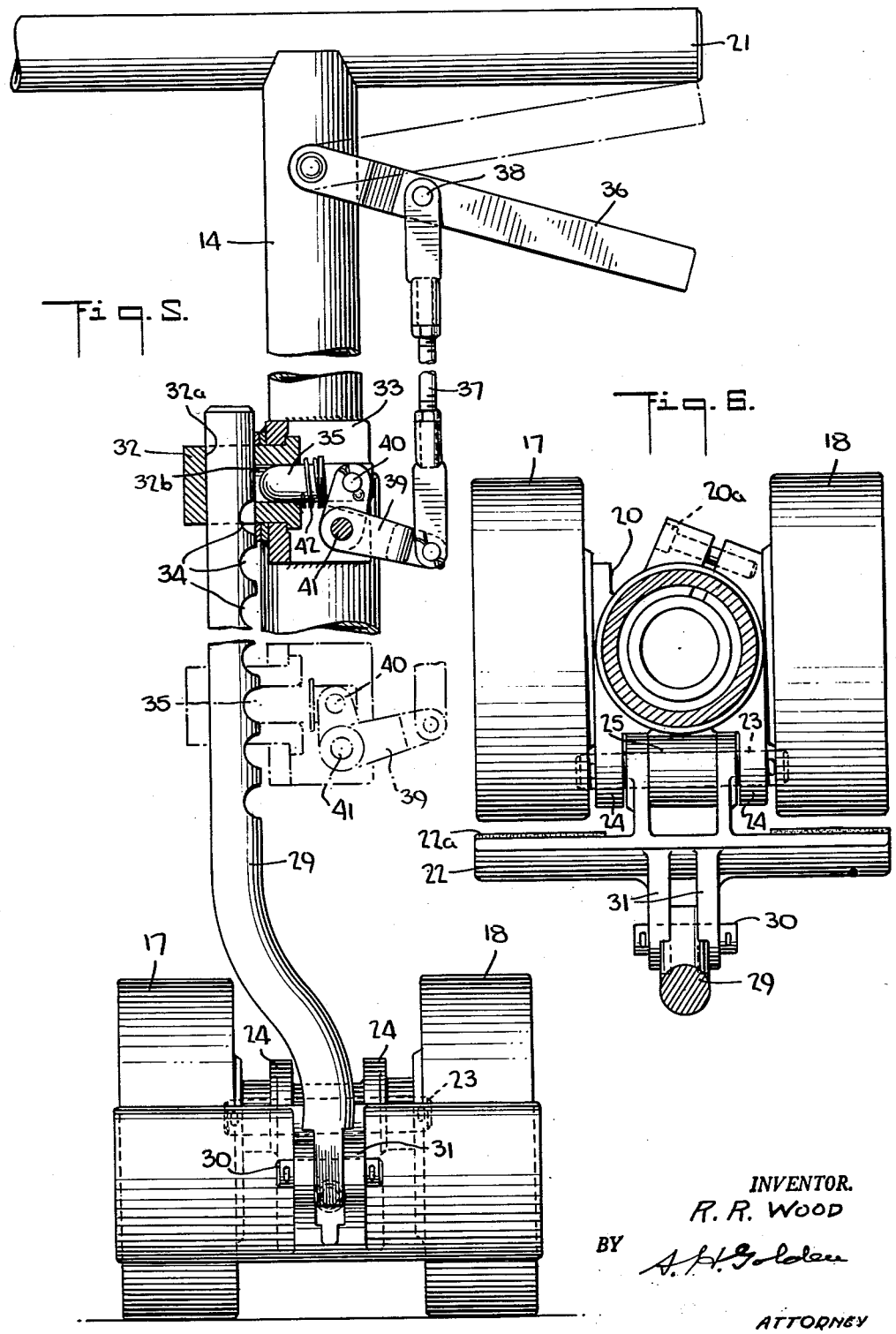
INVENTOR.
R. R. WOOD
BY
ATTORNEY

United States Patent Office 3,074,516
Patented Jan. 22, 1963

3,074,516
BRAKING MECHANISM FOR HAND TRUCK
Robert Russell Wood, St. Catharines, Ontario, Canada, assignor to The Yale and Towne Manufacturing Company, Stamford, Conn., a corporation of Connecticut
Filed May 12, 1959, Ser. No. 812,719
6 Claims. (Cl. 188—119)

This invention relates to trucks of the type having a steering tongue which is pivotally mounted for vertical movement so that the tongue may be elevated or lowered by the operator in accordance with operating requirements. More particularly, the invention relates to a braking mechanism for such trucks.

It will be appreciated that in the normal operation of a truck of this type the tongue may be moved to various vertical positions depending on whether the truck is being moved up or down an incline, or depending on the available space for moving and turning the truck. It will also be appreciated that there are numerous times when it is desirable to brake the rolling of the truck.

The present invention provides a novel arrangement whereby braking action may be applied by slight vertical movement of the tongue regardless of the particular vertical pivotal position of the tongue at the time.

In accordance with the invention, means are provided for selectively connecting a brake actuating member to the tongue in a plurality of pivotal positions of the tongue whereby slight vertical movement of the tongue is transmitted to the actuating member to actuate the brakes.

The invention having been broadly described, a more detailed description is given hereafter by reference to the accompanying drawings wherein:

FIG. 1 is a perspective view of a truck incorporating the present invention;

FIG. 2 is an exploded view of the brake mechanism;

FIG. 3 is a side elevational view, partly in section, showing the braking mechanism and the mechanism for selectively connecting the braking mechanism to the steering tongue;

FIG. 4 is a sectional view taken on line 4—4 of FIG. 3;

FIG. 5 is an elevational view showing the braking mechanism and the mechanism for selectively connecting the braking mechanism to the steering tongue; and FIG. 6 is a sectional view taken on the line 6—6 of FIG. 3.

Referring to the drawings and in particular to FIG. 1, the invention is shown applied to a hand lift pallet truck. The details of the particular truck, other than the steering tongue and braking mechanism, form no part of the present invention. It is sufficient to point out that the truck includes hydraulically actuated forks 10 which carry retractable rollers 11 adjacent their outer ends. The forks 10 are mounted at the other end on a main frame 12 for vertical movement relative to the frame by a suitable hydraulic actuating mechanism. In utilizing the truck, the forks are inserted under a loaded pallet and elevated to lift the pallet and load from the ground or floor. As the forks 10 are elevated the rollers 11 drop down to help support the load.

The truck is adapted to be steered and pulled or pushed by an elongated steering tongue 14 which is pivotally attached for vertical movement to the forked upper end of a steering post 15 by means of a pin 16. The steering post 15 is journalled for rotary steering movement in the frame 12 and carries a pair of supporting wheels 17 and 18 at its lower end. The wheels 17 and 18 are carried on a common axle 19 which in turn is carried by a split collar 20 (FIGS. 2, 3 and 6) which is clamped to the end of the steering post 15 by means of bolts 20a. Rotation of the tongue 14 in a generally horizontal direction serves to turn the post 15 and the wheels 17 and 18 carried thereby to effect steering of the truck. A cross arm or handle 21 (FIGS. 1 and 5) may be provided at the end of the tongue 14 to facilitate pulling and pushing of the truck.

As best shown in FIGS. 2 and 3, the brake mechanism consists of a simple, pivotally mounted brake shoe 22 having a lining 22a adapted to be pressed against the outer peripheries of the wheels 17 and 18 to provide a braking action to the truck. The shoe 22 is conveniently pivotally mounted or hinged to the collar 20 by means of a pin 23 which extends through openings in a pair of spaced ears 24 formed integrally with the collar 20 and through an opening in a hinge member or projection 25 formed integrally with the brake shoe 22. A compression spring 26 carried on one end on a pin 27 secured to the collar 20 and carried at the other end on a pin 28 (FIG. 3) carried by the brake shoe 22 serves to normally hold the brake shoe 22 out of engagement with the wheels 17 and 18.

The brake shoe 22 is adapted to be pressed against the wheels to prevent rotation thereof by means of an actuating rod 29 which is pivotally secured at one end by means of a pin 30 to spaced bosses 31 formed integrally with or welded to the brake shoe 22. Downward movement of actuating rod 29 pivots the brake shoe 22 against the peripheries of the wheels 17 and 18, as indicated by the broken lines in FIG. 3, to provide a braking action.

In accordance with the invention, the actuating rod 29 is adapted to be selectively secured to the tongue 14 in a plurality of vertically pivoted positions of the tongue so that the rod 29 may be moved to actuate the braking mechanism by slight vertical downward movement of the tongue 14 by the operator.

As best shown in FIGS. 3 and 5, the actuating rod 29 extends through a bore 32a in a guide member or block 32. The guide member 32 is rotatably secured to the base of a channel-shaped bracket 33. One leg of the bracket 33 is welded or otherwise secured to the tongue 14. This arrangement holds the rod 29 adjacent the tongue 14 while allowing relative movement between the rod 29 and the tongue 14 when the rod is not locked to the tongue 14.

As best shown in FIG. 5, the rod 29 is adapted to be selectively locked or connected to the tongue 14 in various pivotal positions of the tongue 14 by engagement of a sliding cylindrical bolt 35 with one of a plurality of notches 34 formed in the rod 29. The bolt 35 is slidably mounted in a bore 32b which communicates with the bore 32a. The bolt 35 is adapted to be selectively moved by the operator to engage in one of the notches 34 by lifting a lever 36 which is pivotally secured at one end to the tongue 14 adjacent handle 21. Lever 36 is operatively connected to the bolt 35 by means of a connecting rod 37. Rod 37 is pivotally attached at one end to the lever 36 by a pin 38 and pivotally attached at the other end to one leg of a bell crank 39. The other leg of the bell crank 39 is bifurcated and pivotally attached by a pin 40 to the end of the bolt 35. Bell crank 39 is pivotally supported on a shaft 41 carried by the bracket 33. Lifting of the lever 36 by the operator to the position shown in dash lines in FIG. 5 causes the bolt 35 to be moved into engagement with one of the notches 34 to thereby lock the rod 29 to the tongue 14. After locking the rod to the tongue 14, slight pivotal movement of the tongue 14 vertically downward will apply the brakes.

While the action of gravity on the lever 36 will normally hold the bolt 35 out of engagement with the notches 34, except when the lever 36 is manually lifted, a spring 42 may be provided around the bolt 35 for this purpose.

From the above description it can be seen that there is provided a novel arrangement which permits brakes to be applied to a hand truck in various vertical positions of the tongue by locking a brake member to the tongue and effecting slight vertical movement of the tongue. The brake member may be readily locked to the tongue by lifting the lever 36 to engage the bolt 35 in a notch 34 which is in alignment with the bolt in the particular pivotal position of the tongue. Slight pivotal movement of the tongue downwardly will then apply the brakes.

While one embodiment of the invention has been shown and described, it will be appreciated that this is for the purposes of illustration only and that modifications can be made therein without departing from the spirit and scope of the invention.

I now claim:

1. A truck having supporting wheels and steering tongue means secured to said truck for pivotal movement in a vertical plane, said tongue means having a handle at the free end thereof, a brake mechanism on said truck, an actuating member connected to said brake mechanism and positioned to actuate said brake mechanism to apply a braking force to one of said wheels on said truck, and means on said tongue means having actuating means adjacent said handle positioned for connecting said actuating member to said tongue means when said tongue means is in either a substantially vertical position or in a substantially horizontal position and also for selectively connecting said actuating member to said tongue means in any one of a plurality of pivotal positions of said tongue means between said substantially vertical and horizontal positions of said tongue means whereby movement of said tongue means may be transmitted to said actuating member to actuate said brake mechanism in various substantially different pivotal positions of said tongue means.

2. A truck having supporting wheels and steering tongue means secured to said truck for pivotal movement in a vertical plane, said tongue means having a handle at the free end thereof, a brake mechanism on said truck, an actuating rod connected to said brake mechanism and positioned to actuate said brake mechanism to apply a braking force to one of said wheels on said truck, and means on said tongue means having actuating means adjacent said handle positioned for connecting said actuating rod to said tongue means when said tongue means is in either a substantially vertical position or in a substantially horizontal position and also for selectively connecting said actuating rod to said tongue means in any one of a plurality of pivotal positions of said tongue means between said substantially vertical and horizontal positions of said tongue means whereby movement of said tongue means may be transmitted to said actuating rod to actuate said brake mechanism in various substantially different pivotal positions of said tongue means.

3. A truck having supporting wheels and steering tongue means secured to said truck for pivotal movement in a vertical plane, said tongue means having a handle at the free end thereof, a brake mechanism on said truck, an actuating rod connected to said brake mechanism and positioned to actuate said brake mechanism to apply a braking force to one of said wheels on said truck, and cooperating means on said rod and on said tongue means having actuating means adjacent said handle positioned for connecting said actuating rod to said tongue means when said tongue means is in either a substantially vertical position or in a substantially horizontal position and also for selectively connecting said actuating rod to said tongue means in any one of a plurality of pivotal positions of said tongue means between said substantially vertical and horizontal positions of said tongue means whereby movement of said tongue means may be trasmitted to said actuating rod to actuate said brake mechanism in various substantially different pivotal positions of said tongue means.

4. A truck having supporting wheels and steering tongue means secured to said truck for pivotal movement in a vertical plane, said tongue means having a handle at the free end thereof, a brake mechanism on said truck, an actuating rod connected to said brake mechanism and positioned to actuate said brake mechanism to apply a braking force to one of said wheels on said truck, guide means on said tongue means slidably engaging said rod for holding said rod in juxtaposition during relative movement between said tongue means and said rod, and latch means on said tongue means and cooperating means on said rod for locking said rod to said tongue means when said tongue means is in either a substantially vertical position or in a substantially horizontal position and also for selectively connecting said rod to said tongue means in any one of a plurality of pivotal positions of said tongue means between said substantially vertical and horizontal positions of said tongue means whereby movement of said tongue means may be transmitted to said actuating rod to actuate said brake mechanism in various substantially different pivotal positions of said tongue means.

5. A truck having supporting wheels and steering tongue means secured to said truck for pivotal movement in a vertical plane, said tongue means having a handle at the free end thereof, a brake mechanism on said truck, an actuating rod connected to said brake mechanism and positioned to actuate said brake mechanism to apply a braking force to one of said wheels on said truck, guide means on said tongue means slidably engaging said rod for holding said rod in juxtaposition during relative movement between said tongue means and said rod, a plurality of notches on said rod spaced longitudinally of said rod, and a bolt slidably carried by said tongue means having means for selectively engaging one of said notches for locking said rod to said tongue means when said tongue means is in either a substantially vertical position or in a substantially horizontal position and also for selectively connecting said rod to said tongue means in any one of a plurality of pivotal positions of said tongue means between said substantially vertical and horizontal positions of said tongue means whereby movement of said tongue means may be transmitted to said actuating rod to actuate said brake mechanism in various substantially different pivotal positions of said tongue means.

6. A truck having a steering post, a supporting wheel secured to one end of said post, a steering tongue pivotally secured to the other end of said post for pivotal movement in a vertical plane, said steering tongue means having a handle at the free end thereof, a brake shoe pivotally attached to said post for pivotal movement against said wheel to provide a braking action, an actuating rod secured to said brake shoe and positioned to press said shoe against said wheel, and means on said tongue means having actuating means adjacent said handle positioned for connecting said actuating rod to said tongue means when said tongue means is in either a substantially vertical position or in a substantially horizontal position and also for selectively connecting said actuating rod to said tongue means in any one of a plurality of pivotal positions of said tongue means between said substantially vertical and horizontal positions of said tongue means whereby movement of said tongue means may be transmitted to said actuating rod to actuate said brake mechanism in various substantially different pivotal positions of said tongue means.

References Cited in the file of this patent

UNITED STATES PATENTS

| | | |
|---|---|---|
| 1,289,078 | Ayler | Dec. 31, 1918 |
| 1,389,917 | Thompson | Sept. 6, 1921 |
| 2,453,575 | House | Nov. 9, 1948 |
| 2,479,931 | Howard | Aug. 23, 1949 |
| 2,620,198 | Johnston | Dec. 2, 1952 |
| 2,685,351 | Kamcsak | Aug. 3, 1954 |
| 2,709,493 | Hupp | May 31, 1955 |
| 2,738,034 | Levine | Mar. 13, 1956 |
| 2,775,313 | Kurvers et al. | Dec. 25, 1956 |
| 2,788,093 | Steinberg et al. | Apr. 9, 1957 |

FOREIGN PATENTS

| | | |
|---|---|---|
| 518,469 | Austria | Jan. 29, 1931 |
| 339,868 | Germany | Aug. 15, 1921 |